United States Patent
Föhl

[19]

[11] Patent Number: 5,628,469
[45] Date of Patent: May 13, 1997

[54] BELT RETRACTOR WITH AN INTEGRATED BELT PRETENSIONER AND AN ENERGY CONVERTER

[75] Inventor: Artur Föhl, Schorndorf, Germany

[73] Assignee: TRW OccupantRestraint Systems GmbH, Alfdorf, Germany

[21] Appl. No.: 547,898

[22] Filed: Oct. 24, 1995

[30] Foreign Application Priority Data

Oct. 25, 1994 [DE] Germany ............... 44 38 097.6

[51] Int. Cl.$^6$ .......................... B60R 22/28; B60R 22/46
[52] U.S. Cl. .......................... 242/374; 242/379.1
[58] Field of Search ................... 242/374, 379.1; 280/806, 805; 297/470, 471, 472, 478

[56] References Cited

U.S. PATENT DOCUMENTS

| | | | |
|---|---|---|---|
| 5,344,095 | 9/1994 | Frei | 242/374 |
| 5,522,564 | 6/1996 | Schmidt et al. | 242/374 |
| 5,526,996 | 6/1996 | Ebner et al. | 242/374 |

FOREIGN PATENT DOCUMENTS 4227781  2/1994  Germany .

*Primary Examiner*—John M. Jillions
*Attorney, Agent, or Firm*—Tarolli, Sundheim, Covell, Tummino & Szabo

[57] ABSTRACT

The belt retractor comprises an integrated belt pretensioner and an energy converter for limiting the belt force occurring after the tensioning of the belt. Once the belt has tensioned a torsion bar (14) arranged coaxially in the belt reel (12) is in the force flow path. The locking mechanism of the belt retractor comprises two locking pawls (22, 24) rotatably mounted on one face of the belt reel (12), said pawls being insertable into a locking toothing (30, 32) surrounding them on the frame (10). The first end of the torsion bar (14) is connected to the belt reel (12) in a non-rotational arrangement while its second end (14b) comprises a control disc (42) mounted for limited rotation, with the control disc acting on the locking pawls (22, 24) at least during the phase of energy conversion, thus preventing them from engaging into the locking toothing (30, 32). This second end (14b) of the torsion bar (14) is couplable to the frame (10) in a non-rotational load-bearing arrangement.

11 Claims, 4 Drawing Sheets

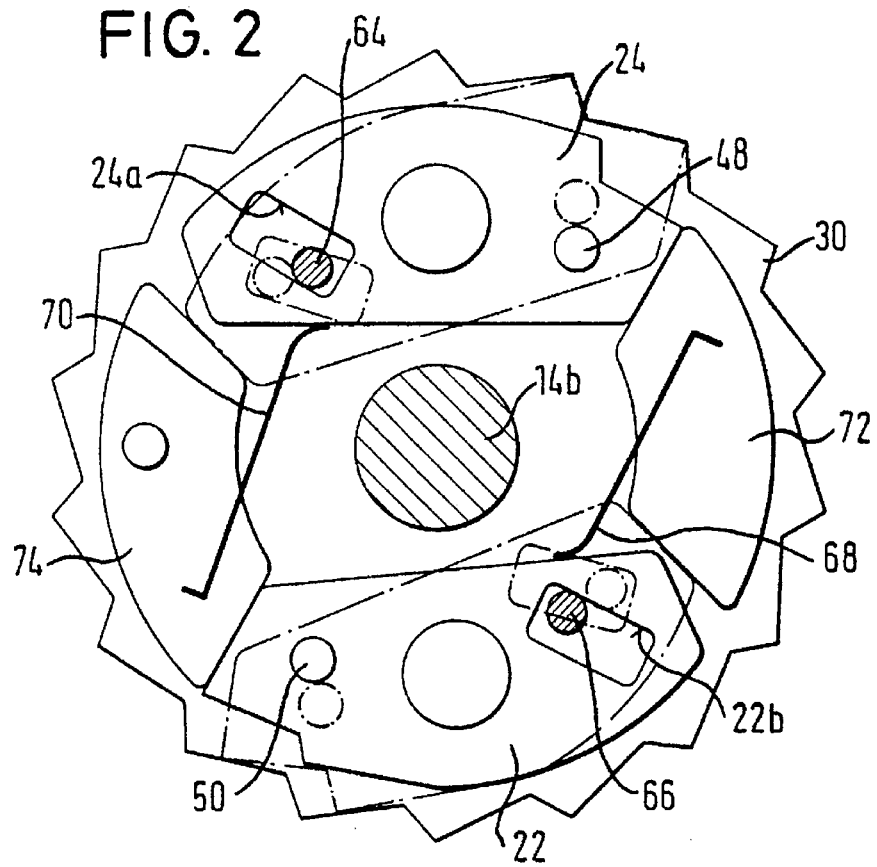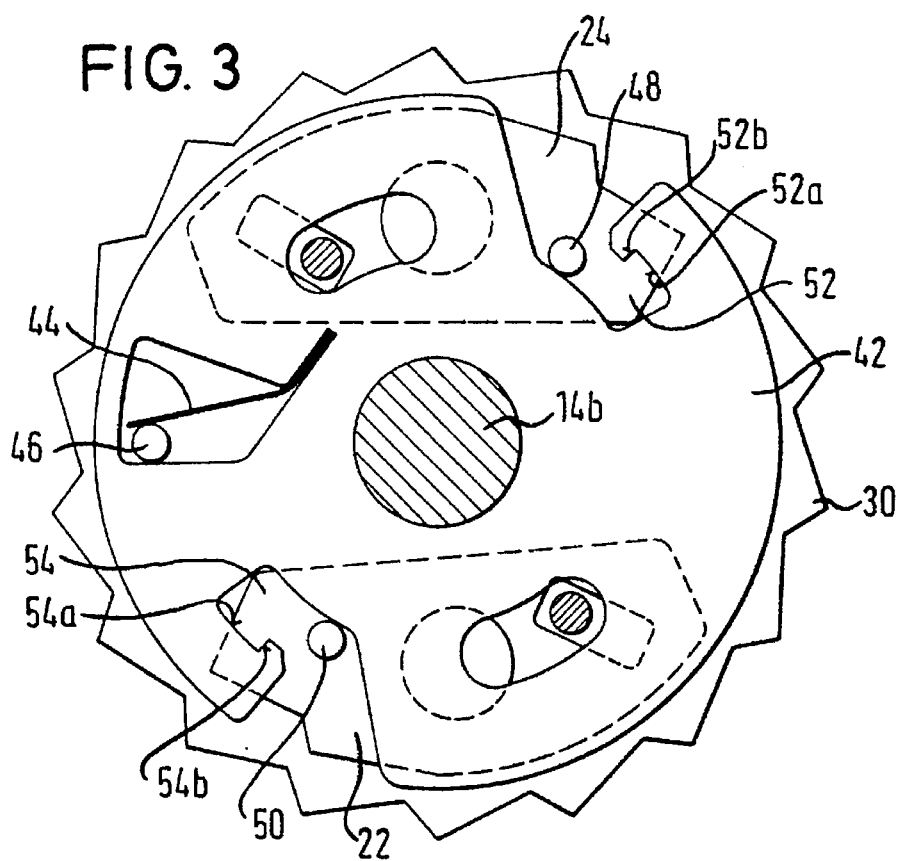

BELT RETRACTOR WITH AN INTEGRATED BELT PRETENSIONER AND AN ENERGY CONVERTER

The present invention relates to a belt retractor comprising an integrated belt pretensioner and an energy converter for limiting the belt force occurring after the tensioning of the belt.

A belt retractor with these features is already known from DE 42 27 781 A1. It is particularly well suited for use in combination with an inflatable restraint system (Airbag). Once the belt has been tensioned the torsion bar limits the belt force that occurs as a result of the forward movement of the vehicle passenger since the torsion bar is in the force flow path between the belt webbing and the retractor frame and is twisted about its axis in the event of a predefined load being exceeded. If the torsion bar is made of soft iron several revolutions are possible without there being any risk of destruction.

However, a belt retractor of this type needs to satisfy all conventional functions without restriction: a vehicle-sensitive and webbing-sensitive locking function in normal operation, a tensioning function once a certain actuation threshold is reached, and full operatability of the locking mechanism after belt tensioning in view of the possibility of a subsequent impact.

At the same time a belt retractor of this type must be of a compact design achievable at low technical expenditure. On the belt retractor of the known type this requirement has led to the coupling disc being used not only for the load-bearing coupling of the torsion bar to the frame of the belt retractor but also for coupling the pretensioning drive. As a consequence the torsion bar is also in the force flow path of the pretensioning drive, as a result of which the latter's drive force is limited in an undesirable way.

The invention provides a belt retractor that comprises both an integrated belt pretensioner and an energy converter for limiting the belt force once the belt has been tensioned, and with a compact design that can be achieved at low cost meets all the requirements imposed on the locking mechanism, in particular a quick-reaction vehicle-sensitive and webbing-sensitive locking function in normal operation, temporary suspension of the locking mechanism's function during energy conversion following the tensioning of the belt, and restoring the locking function following energy conversion. In accordance with the invention a belt retractor is provided which comprises a load-bearing frame with a locking toothing formed thereon, a belt reel rotatably mounted in said frame, a rotary pretensioning drive associated with the belt reel, and a torsion bar mounted coaxially within said reel. The torsion bar has a first end connected to the belt reel and a second end connected to a coupling disc surrounded by an internally toothed ring which is fixed with the frame. At least one locking pawl is pivotally mounted on a face of the belt reel for selective engagement in the locking toothing. A control disc is mounted for limited rotation on the second end of the torsion bar. The control disc engages the locking pawl at least during a phase of energy conversion thus preventing it from engagement with the locking toothing. This phase of energy conversion follows forced rotation of the belt reel by the rotary pretensioning drive and involves twisting of the torsion bar while the second torsion bar end is blocked with respect to the frame by the coupling disc. This particular design of belt retractor effectively provides two locking systems: one for the direct locking of the belt reel on the frame and another for locking the torsion bar on the frame, both locking systems being positioned on the same side of the belt retractor. This provides the opportunity envisaged on the preferred embodiment that the pretensioning drive be positioned on the side of the belt retractor situated opposite the locking systems so that the pretensioning drive is able to act directly on the belt reel and on the end of the torsion bar that is connected in a non-rotational arrangement with said drum respectively. On the same side of the belt retractor the take-up spring of the belt retractor is preferably arranged inside a cartridge.

Moreover, the release disc of the vehicle-sensitive and belt-webbing sensitive release sensor technology is mounted for limited rotation preferably on the second end of the torsion bar on the same side as the two locking systems. This measure results in short, direct control paths for the locking pawl and at the same time in a favourable spatial accommodation for the vehicle-sensitive and webbing-sensitive release sensor technology.

In the interest of a uniform transfer of the blocking load from the belt reel to the frame two locking pawls are fitted to one face of the belt reel. An even more uniform transfer of the blocking load can be obtained by providing for at least one other locking pawl on the opposite face of the belt reel, said pawl being seated on a shaft axially traversing the belt reel; the opposite end of said shaft supports one of the two locking pawls on the first face of the belt reel.

During the phase of energy conversion the function of the locking mechanism must be suppressed. This is the purpose of the control disc, which in the preferred embodiment is positioned axially next to the face of the belt reel bearing the locking pawl while the coupling disc is positioned axially between the control disc and the release disc. The axial distance between the release disc and the locking pawl (or pawls) is bridged by an axial control pin which runs through oblong holes in the coupling disc and in the control disc. To achieve a temporary inhibiting of the locking mechanism's function, in the preferred embodiment the locking pawl comprises a cam projecting axially to the control disc, and the control disc comprises a recess running in the circumferential direction whose radially outer limiting wall catches the cam when the control disc is twisted against the second end of the torsion bar, thus preventing the excursion of the locking pawl. To ensure that the inhibiting of the locking mechanism's function lasts throughout the phase of energy conversion, provision has been made on a first embodiment that the limiting wall at the inlet end of the recess comprises a step directed radially inwards for the cam of the locking pawl, said step catching the cam of the locking pawl maintained in the displaced position by mass inertia forces. On a second embodiment the control disc is latched in the twisted relative position to the belt reel.

Further advantages and features of the invention result from the following description of two embodiments and from the drawing to which reference is made. In the drawing:

FIG. 2 is a top view of the locking elements of the belt retractor;

FIG. 3 is a top view of a control disc provided for inhibiting the locking function temporarily during energy conversion;

Figure 1:
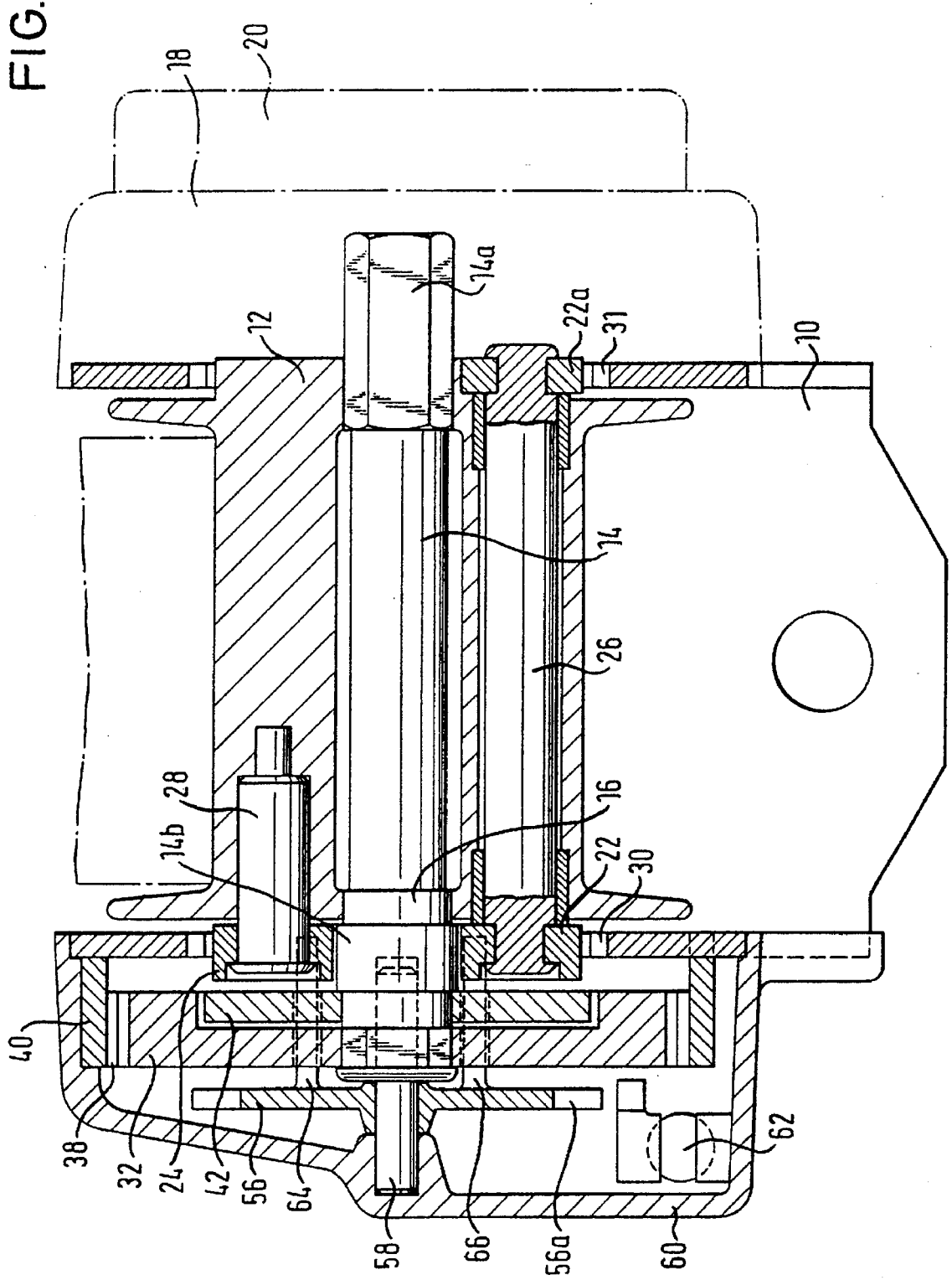
FIG. 1 is a longitudinal section of the belt retractor.

A belt reel 12 is rotatably mounted inside a U-shaped frame 10. Inserted coaxially into the hollowed belt reel 12 is a torsion bar 14, one end 14a of which is shaped as a polygonal profile and connected to belt reel 12 in a non-rotational arrangement, while its other end 14b is rotatably mounted in belt reel 12 at 16. At the end 14a of the torsion bar 14 a pretensioning drive 18—of which knowledge is assumed and which is therefore not described in further detail here—engages via a coupling mechanism, likewise known. The same side of the belt retractor also comprises a spring cartridge 20, which holds a retractor spring also engaging at the end 14a of the torsion bar 14.

On the opposite side of the belt retractor two locking pawls 22, 24 are rotatably mounted at the face of belt reel 12. The locking pawl 22 is linked in a non-rotational connection to a shaft 26 which axially traverses the belt reel 12 and supports another coupling pawl 22a, also in a non-rotational connection, on the opposite face of belt reel 12. The locking pawl 24 is rotatably mounted on a bolt 28. The locking pawls 22, 22a and 24 are each surrounded by a locking toothing 30 and 31 in a bore of one of the two lateral legs of the frame 10.

Figure 6:
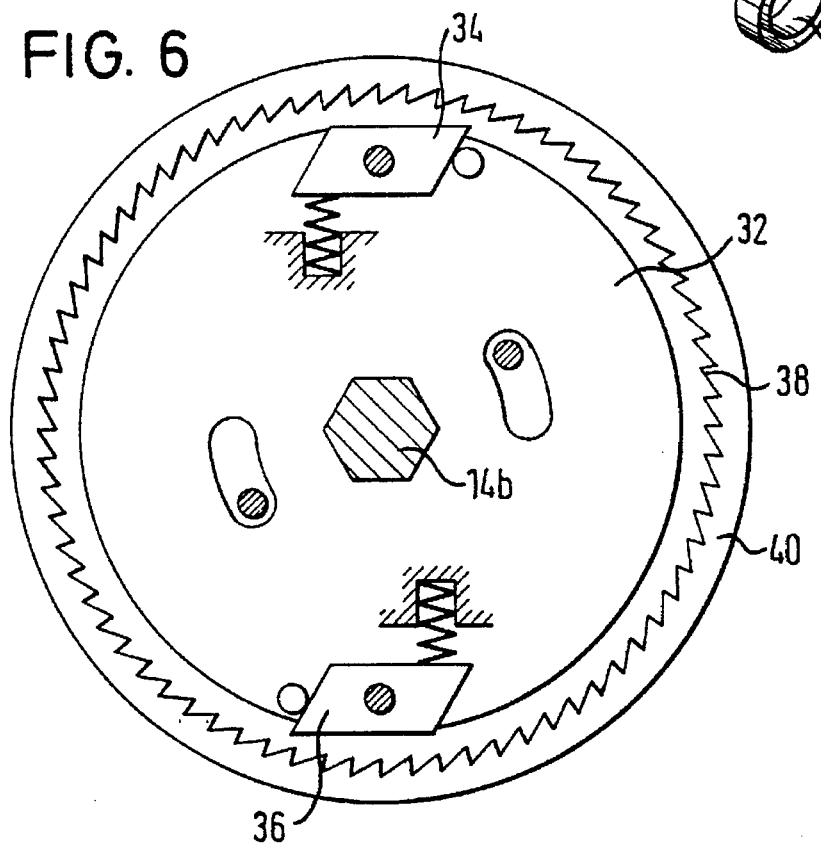
FIG. 6 is a top view of the coupling disc for the locking mechanism associated to the torsion bar.

A coupling disc 32 is connected non-rotationally to the end 14b of torsion bar 14. As illustrated in FIG. 6 the coupling disc 32 has along its circumference two rotatably mounted coupling pawls 34, 36, which are mounted in their centre of gravity and in the rest position are spring-loaded against an abutment. These coupling pawls 34, 36 are surrounded by a locking toothing 38 in a ring 40, which is connected in a load-bearing arrangement with one of the two lateral legs of frame 10. The coupling pawls 34, 36 are inserted into the locking toothing 38 responsive to the angular acceleration of the coupling disc 32.

Figure 4:
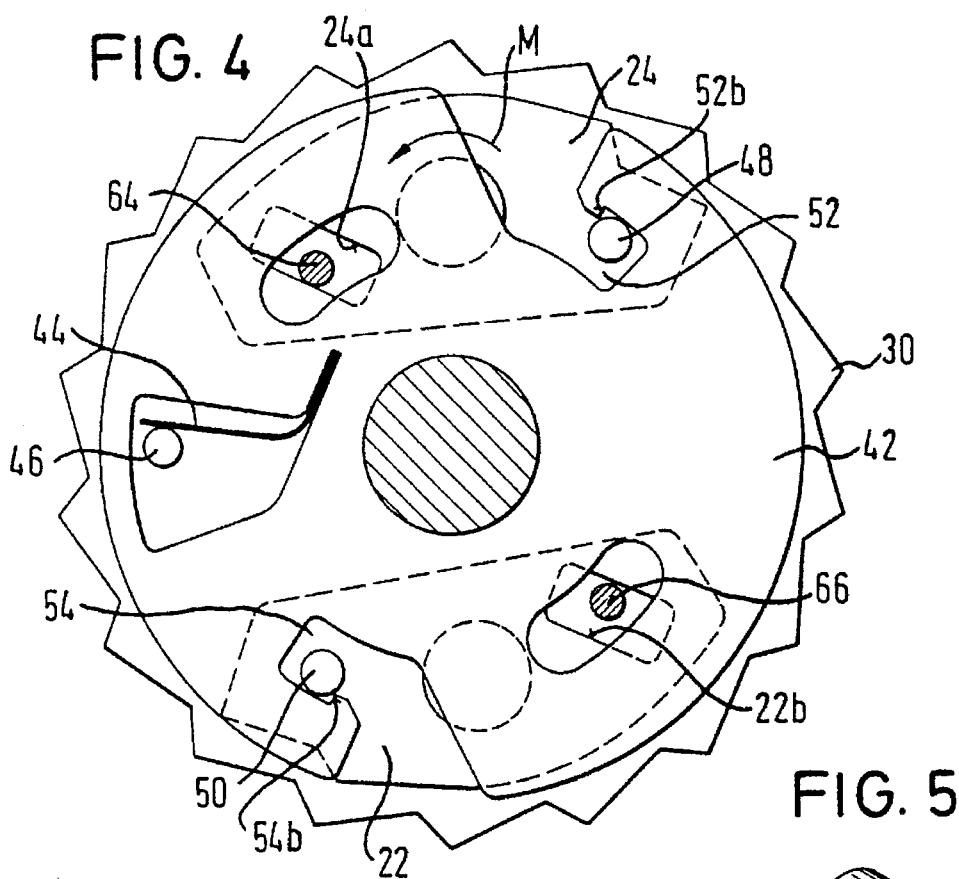
FIG. 4 is an analog top view of the control disc in the activated state.

Between coupling disc 32 and the adjacent face of belt reel 12 a control disc 42 is mounted for limited rotation against the force of a return spring 44, which is supported on an axial stud 46 in the adjacent face of belt reel 12. Each of the locking pawls 22, 24 comprise a cam 48 and 50 respectively projecting axially in the direction of control disc 42. As long as control disc 42 is not twisted relatively to end 14b of torsion bar 14 these cams 48, 50 are located at the inlet end of a recess 52 and 54 respectively in control disc 42, said recess running in a circumferential direction. The radially outer limiting walls 52a and 54a of recesses 52 and 54 respectively each comprise a step 52b and 54b respectively directed radially inwards in the area of the inlet end; said steps engage behind the relevant cams 48 and 50 of the corresponding, displaced locking pawl 22 and 24 when control disc 42 is twisted relatively to end 14b of torsion bar 14, thereby retaining the pawl in the displaced state (FIG. 4).

At end 14b of torsion bar 14 a release disc 56 is also mounted for limited rotation by means of a flange bolt 58. Flange bolt 58 provides the axial localisation for coupling disc 32 and control disc 42. It also forms the bearing for torsion bar 14, and consequently for belt reel 12, in a bearing cover 60, which is placed onto the adjacent leg of frame 10.

Release disc 56 is provided at its circumference with a control gearing 56a which in a known manner cooperates with a vehicle-sensitive sensor 62. At the same time, by virtue of its mass inertia, release disc 56 ensures the belt-webbing sensitive actuation function by lagging behind a sharply accelerated rotation of belt reel 12. Release disc 56 comprises two axially projecting control pins 64, 66, which project through appropriately shaped oblong holes in coupling disc 32 and control disc 42 and engage into window-like apertures 22a and 24a in locking pawls 22 and 24.

FIG. 2 shows in continuous lines locking pawls 22, 24 in their rest position, in which they are preloaded by leaf springs 68 and 70. These leaf springs 68, 70 are clamped into support cams 72 and 74, which are provided axially projecting on the relevant face of belt reel 12. The support cams 72 and 74 are axially projecting support elements. In the displaced position, illustrated in FIG. 2 by dot-and-dash lines, locking pawls 22, 24 bear in the circumferential direction on these cams 74 and 72.

For normal operation locking pawls 22, 22a and 24, together with locking toothings 30, 31, release disc 56, vehicle-sensitive sensor 62 and control pins 64, 66, form a locking mechanism that meets all the usual requirements with regard to sensitivity to both the belt webbing and the vehicle. Once a predefined actuation threshold is reached, pretensioning drive 18 comes into operation. Belt reel 12 is turned in the take-up direction by pretensioning drive 18 in order to take up a length of belt webbing of up to approx. 20 cm on to belt reel 12. Following the tensioning of the belt a sudden acceleration of belt reel 12 occurs in the opposite direction due to the sudden forward movement of the vehicle passenger and the energy stored in the belt system by the tensioning. Due to the high angular acceleration of belt reel 12 the rotation of control disc 42 lags behind, as a result of which cams 48, 50 engage into recesses 52, 54. At the same time coupling pawls 34, 36 are displaced so that coupling disc 32 is coupled with frame 10 in a non-rotational connection. Belt webbing pay-out is now only possible through torsion of torsion bar 14. Torsion of torsion bar 14 is a plastic deformation through which finally a limitation of the belt force to values generally recognized as safe is achieved.

By making a suitable choice of the point of gravity for locking pawls 22, 24 in relation to their pivot axis, said pawls are subjected to a mass moment of inertia M (FIG. 4) during the angular acceleration of belt reel 12 in the payout direction tending to retain them in the displaced position. However, since radial steps 52b, 54b catch cams 48, 50, locking pawls 22, 24 are effectively prevented from engaging with locking toothing 30.

Thereafter coupling pawls 34, 36 release themselves from locking toothing 38, control disc 42 is turned back by return spring 44, and cams 48, 50 disengage from recesses 52, 54 of control disc 42 so that the normal function of the webbing-sensitive and vehicle-sensitive locking mechanism is restored.

Figure 5:
FIG. 5 is a perspective view of a spring brake for damping the return of the control disc.

To ensure that control disc 42 does not release locking pawls 22, 24 too soon, their return is delayed by a spirally wound band spring 70 shown schematically in FIG. 5. Spirally wound band spring 70 inhibits the rotation of control disc 42 through wrap friction in the direction of its return rotation only. Wrap spring 70 is arranged at the interface between control disc 42 and the end 14b of torsion bar 14. The turns of the wrap spring 70 extend, when viewed from the outer turn towards the inner turn, opposite the direction of rotation of control disc 42 relative to the torsion bar 14 upon high angular acceleration of belt reel 12.

Figure 7A:
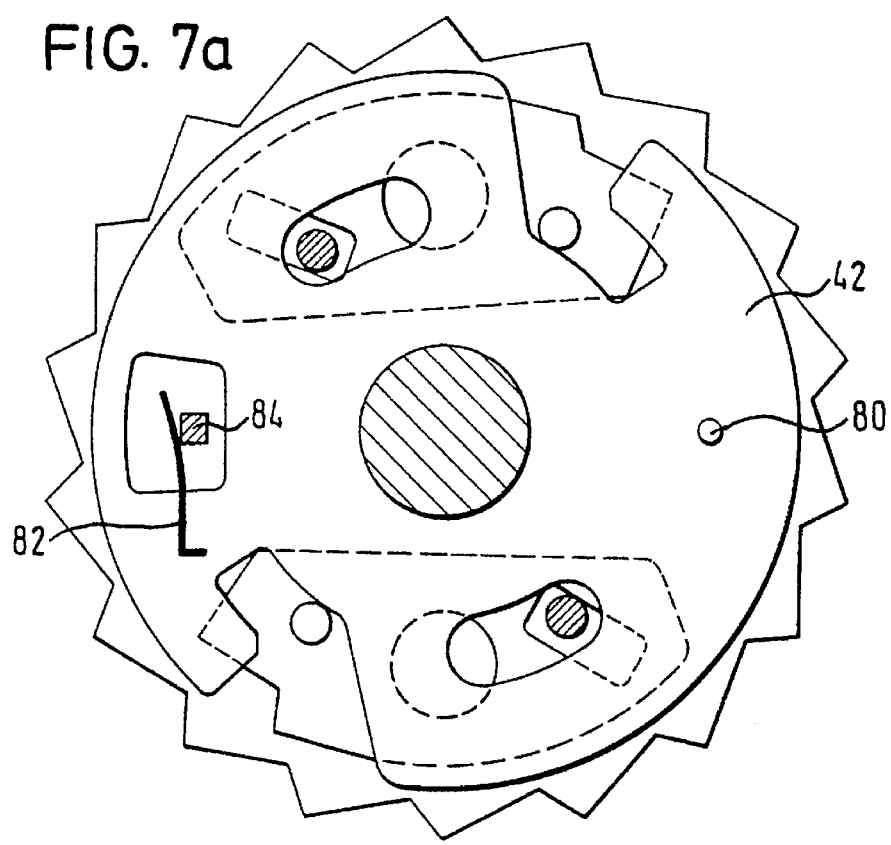
FIGS. 7a and 7b represent an alternative embodiment of the belt retractor shown in FIGS. 1 to 6.
Figure 7B:
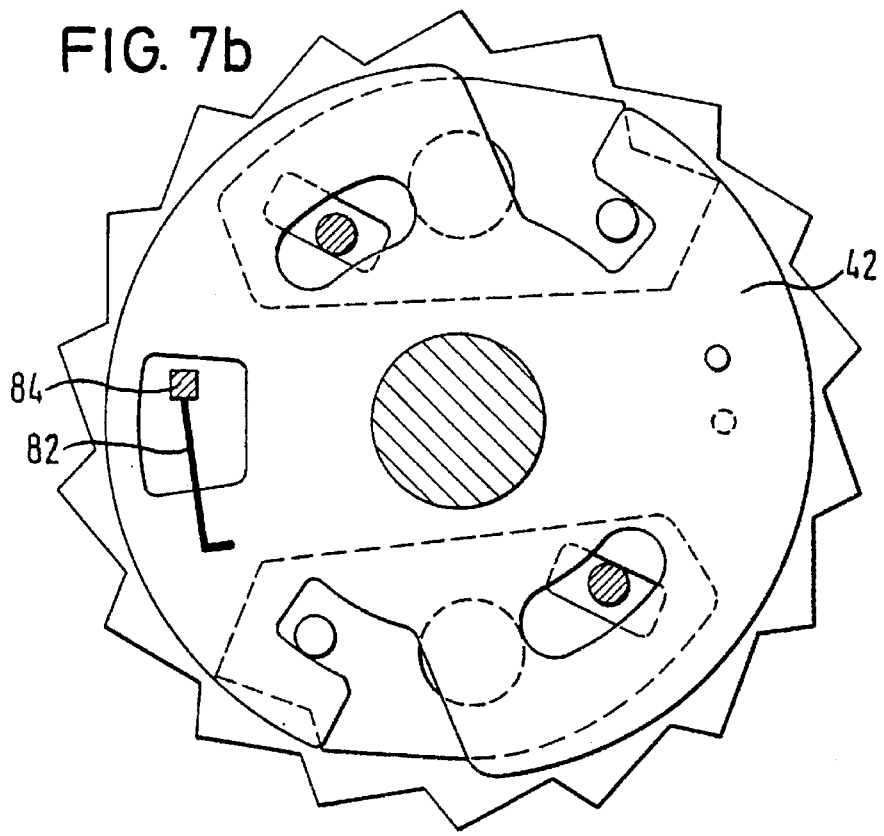

The embodiment shown in FIGS. 7a and 7b is provided if after tensioning of the belt during a subsequent accident torsion bar 14 is to remain in the force flow path in order to limit the belt force. In this embodiment control disc 42 is maintained in the rest position shown in FIG. 7a relative to belt reel 12 by a shearing pin 80. Shearing pin 80 is sheared off by the inertial forces of control disc 42 during the sudden return rotation of the belt reel following a tensioning of the belt. Control disc 42 is then rotated into the position relative to belt reel 12 shown in FIG. 7b. In this state a leaf spring 82 clamped on control disc 42 snaps behind a locking cam 84 projecting axially from belt reel 12 so that control disc 42 is latched in its position rotated relatively to belt reel 12. Locking pawls 22, 24 are now permanently de-activated. However, the locking mechanism consisting of coupling disc 32, locking pawls 34, 36 and ring 40 with locking toothing 38, remains operative; in the embodiment shown, its response is only webbing-sensitive. To ensure that safe, quick engagement is ensured even in the event of an accidental impacting of the tooth tips on one another, locking pawls 34, 36 are slightly offset in the circumferential direction in relation to the tooth pitch of locking toothing 38.

What is claimed is:

1. A belt retractor comprising a frame with a locking toothing, a belt reel rotatably mounted in said frame, a rotary pretensioning drive associated with said belt reel, a torsion bar mounted coaxially in said reel, the torsion bar having a first end connected to the belt reel and a second end connected to a coupling disc, an internally toothed ring surrounding said coupling disc and fixed with the frame, at least one locking pawl pivotally mounted on a face of said belt reel for selective engagement in said locking toothing, and a control disc is mounted for limited rotation on said second end of the torsion bar, and said control disc engaging said locking pawl at least during a phase of energy conversion, thus preventing it from engaging with said locking toothing, said phase of energy conversion following forced rotation of said belt reel by said rotary pretensioning drive and being achieved by twisting of said torsion bar while said second torsion bar end is blocked with respect to said frame by means for blocking on said coupling disc.

2. The belt retractor of claim 1, wherein a release disc is mounted on said second end of the torsion bar for limited rotation, said release disc selectively engaging said locking pawl.

3. The belt retractor of claim 2, wherein said control disc is positioned axially next to said face of the belt reel supporting said locking pawl and said coupling disc being positioned axially between said control disc and said release disc.

4. The belt retractor of claim 3, wherein said release disc comprises an axial control pin which runs through oblong holes in said coupling disc and in said control disc and engages said locking pawl.

5. The belt retractor of claim 3, wherein said locking pawl has a cam projecting axially towards said control disc and said control disc has a recess extending in a circumferential direction with a radially outer limiting wall which catches said cam when said control disc is rotated relative to said second end of the torsion bar, thus preventing pivoting of said locking pawl.

6. The belt retractor of claim 5, wherein said control disc is biased by a resetting spring in a rest position relative to said belt reel and said radially outer limiting wall has a step directed radially inwards and catching said cam of the locking pawl which is held deflected by mass inertia forces.

7. The belt retractor of claim 5, wherein said control disc is maintained in a rest position relative to said belt reel by a retaining means yielding at high angular acceleration and is maintained in a relatively rotated position by latching means.

8. The belt retractor of claim 1, wherein on said face of the belt reel supporting said locking pawl there is formed an axially projecting support element for said locking pawl to absorb load in a circumferential direction.

9. The belt retractor of claim 1, wherein at least one coupling pawl is swivably mounted on the coupling disc, said coupling pawl being surrounded by a blocking toothing connected with the frame, and said coupling pawl being engaged with said blocking toothing by its mass inertia.

10. The belt retractor of claim 1, wherein said pretensioning drive engages on said first end of the torsion bar.

11. The belt retractor of claim 6, wherein rotation of said control disc in a belt webbing take-up direction is counteracted by a spirally wound band spring.

* * * * *